(12) United States Patent
Shae

(10) Patent No.: US 7,377,297 B2
(45) Date of Patent: May 27, 2008

(54) TREE DELIMBER

(75) Inventor: Steve Shae, Owatonna, MN (US)

(73) Assignee: Caterpillar Forest Products Inc., Peoria, IL (US)

( * ) Notice: Subject to any disclaimer, the term of this patent is extended or adjusted under 35 U.S.C. 154(b) by 0 days.

(21) Appl. No.: 11/328,906

(22) Filed: Jan. 10, 2006

(65) Prior Publication Data
US 2006/0157157 A1    Jul. 20, 2006

Related U.S. Application Data

(60) Provisional application No. 60/644,046, filed on Jan. 14, 2005.

(51) Int. Cl.
*A01G 23/095* (2006.01)
*B27M 3/00* (2006.01)

(52) U.S. Cl. .................................. 144/24.13; 144/4.1

(58) Field of Classification Search ............. 144/24.13, 144/4.1, 335, 338, 343
See application file for complete search history.

(56) References Cited

U.S. PATENT DOCUMENTS

| | | | | |
|---|---|---|---|---|
| 4,749,012 A | * | 6/1988 | Hamby, Jr. | ............... 144/24.13 |
| 4,899,794 A | * | 2/1990 | Hamby, Jr. | ............... 144/24.13 |
| 5,515,895 A | * | 5/1996 | Hamby, Jr. | ............... 144/24.13 |
| 5,704,407 A | * | 1/1998 | Hamby, Jr. | ............... 144/24.13 |
| 6,431,232 B1 | * | 8/2002 | Seymour | ................. 144/24.13 |

* cited by examiner

*Primary Examiner*—Bena Miller

(57) ABSTRACT

A tree delimber including a base frame rotatably supporting a yoke and cutting head assembly. The yoke is journalled for rotation in a ring bearing on the base frame adjacent its rear end and supported by a pair of roller units adjacent its front end. Each roller unit includes a vertically adjustable roller, adjustment being possible by manipulation of a single screw shaft accessible from a corresponding side of the base frame.

8 Claims, 3 Drawing Sheets

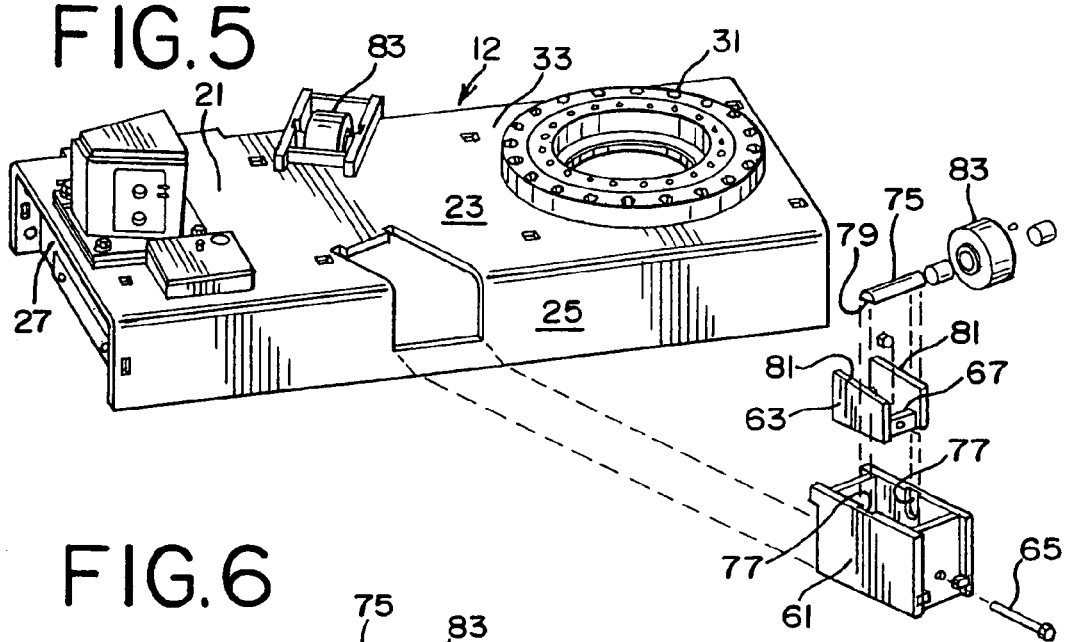
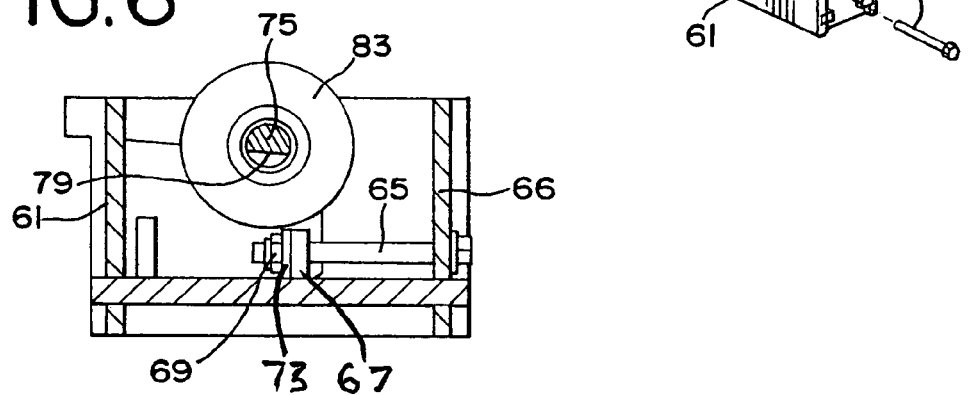
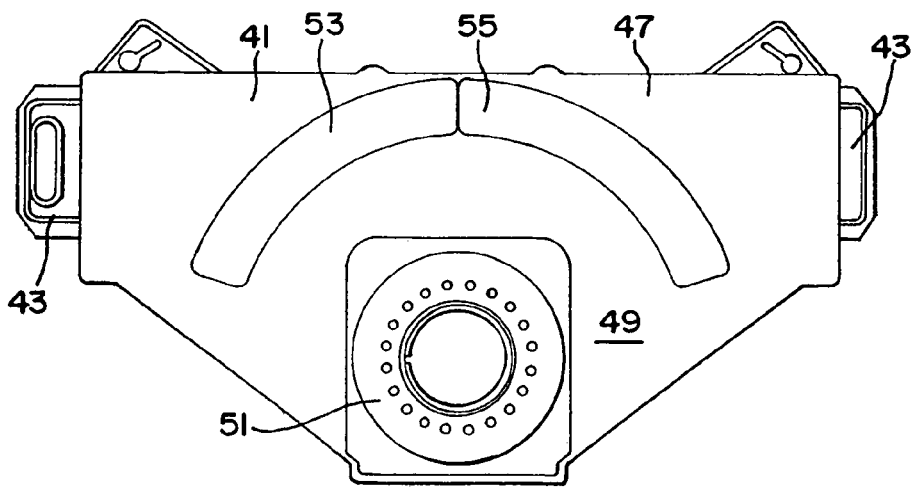

TREE DELIMBER

RELATED APPLICATION

This application is based on Provisional Application Ser. No. 60/644,046, filed Jan. 14, 2005, claims the benefit of the filing date of Provisional Application and incorporates that application by reference in its entirety.

FIELD OF THE INVENTION

This invention relates in general to an apparatus for delimbing trees during tree harvesting operations. It relates particularly to a stationary tree delimber of the type which includes a cutter head assembly mounted on a support frame for rotation about a vertical axis.

BACKGROUND OF THE INVENTION

A conventional delimber of the general type this invention is concerned with is illustrated in Hamby, Jr. U.S. Pat. No. 4,899,794. There it will be seen that a cutter head assembly is mounted in a support yoke for pivotal movement about a horizontal axis relative to the yoke. The yoke includes a floor plate which is mounted for rotational movement about a vertical axis on a horizontal base frame. The yoke floor plate is supported for this rotation on an annular bearing adjacent the front end of the delimber. Adjacent the rear end of the delimber a pair of support rollers fastened to the bottom of the yoke floor plate ride on the roof plate of the base frame in an arc to support the yoke and cutter head assembly as they rotate during delimber operation.

With delimbers of this type, it is conventional to provide some kind of vertical adjustment capability for the afore-described base rollers. Current technology is to mount rollers on the base frame rather than the yoke floor plate, as is shown in the Hamby, Jr. '794 patent delimber. This current technology involves base rollers that are vertically adjustable to assure positive contact with the bottom surface of the yoke floor plate. Adjustment is conventionally effected through the use of four vertical bolts, one on either side of each of two rollers. The bolts are fixed in place by jam nuts which are tightened against the roller housing. These bolts must be accessed from underneath the delimber base frame, and are threaded upward to raise a roller and downward to lower the roller. Careful attention must be given to adjusting each of the bolts equally to ensure parallel contact between the roller and the bottom surface of the yoke floor plate because operation of the delimber with one side of a roller higher than the other will result in uneven wear of the roller, roller bushings, and the mating yoke floor plate surface.

Adjustment is also made difficult because access to the bottom of the base frame is commonly obstructed due to cut limbs and other debris that build up around the delimber on the job site. Furthermore, knowing when individual roller height has been properly adjusted is also a problem because the area of contact between the yoke floor plate and a roller is not readily visible to the operator.

SUMMARY OF THE INVENTION

An object of the invention is to provide an improved tree delimber.

Another object is to provide a new and improved roller support system for the cutter head assembly and yoke in a tree delimber.

Another object is to provide a new and improved roller support system for the cutter head assembly and yoke in a tree delimber.

Yet another object is to provide a roller support system which is easy to adjust for delimber operation.

Still another object is to provide an adjustment feature in a roller support system which requires manipulating only a single adjustment screw that is readily accessible to the delimber operator.

The foregoing and other objects are realized in a tree delimber which includes a base frame, a yoke assembly rotatably mounted on the base frame and a cutter head assembly pivotally mounted on the yoke assembly. The yoke assembly rotates on a vertical axis about an annual bearing on one end of the base frame. At the other end of the base frame a pair of roller units, journalled in the base frame, support the yoke assembly on bearing tracks formed on the bottom of the yoke assembly.

Each of the roller units includes a roller which is vertically adjustable to effect uniform support of the yoke assembly from opposite sides of the base frame. Each roller is vertically adjustable by turning corresponding adjustment bolts accessible from sides of the base frame. The adjustment bolts, which are rotatable on horizontal axes, move the shafts on which the rollers are mounted up or down inclined surfaces, resulting in raising or lowering of the corresponding rollers.

BRIEF DESCRIPTION OF THE DRAWINGS

The invention, including its construction and method of operation, is illustrated more or less diagrammatically in the drawings, in which:

FIG. 5 is an exploded, perspective view of the base frame of FIGS. 3 and 4;

FIG. 6 is a sectional view through a roller assembly from the roller system seen in FIGS. 3 and 4; and FIG. 7 is a bottom plan view of the yoke assembly in the tree delimber of FIG. 1.

DESCRIPTION OF THE PREFFERED EMBODIMENT

Figure 1:
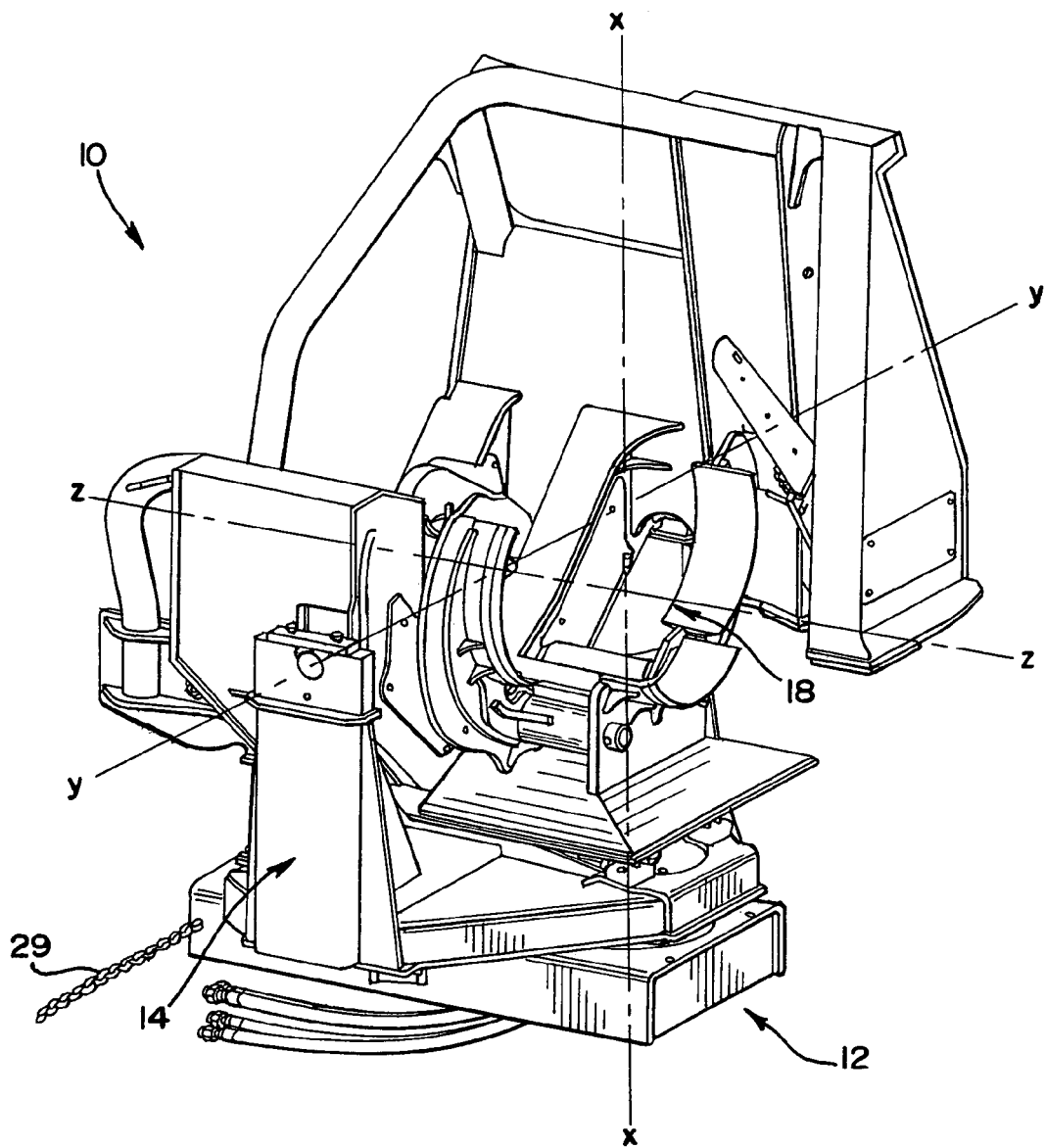
FIG. 1 is a perspective view of a tree delimber incorporating the adjustable roller support system of the present invention.
Figure 2:
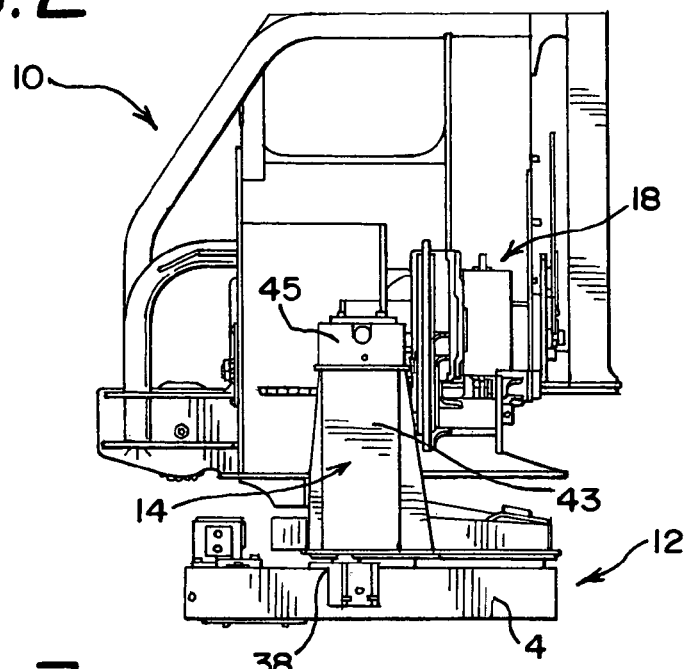
FIG. 2 is a side elevational view of the tree delimber of FIG. 1.

Referring now to the drawings, and particularly to FIGS. 1 and 2, a tree delimber embodying features of the present invention is seen generally at 10. The delimber comprises three major components, a base frame 12, a yoke assembly 14 and a cutter head assembly 18. The yoke assembly 14 is mounted for limited rotational movement on the base frame 12 about a vertical axis X. The yoke assembly 14 supports the cutter head assembly 18 for pivotal movement about a horizontal axis Y.

The cutter head assembly 18 is positioned to cut off the limbs of a downed tree being drawn horizontally through the delimber 10 on the axis Z, and also to saw the top of the tree off. In this regard, in the delimbing operation the downed tree is pulled through the delimber 10 in a conventional manner by a forestry loader or the like.

Figure 3:
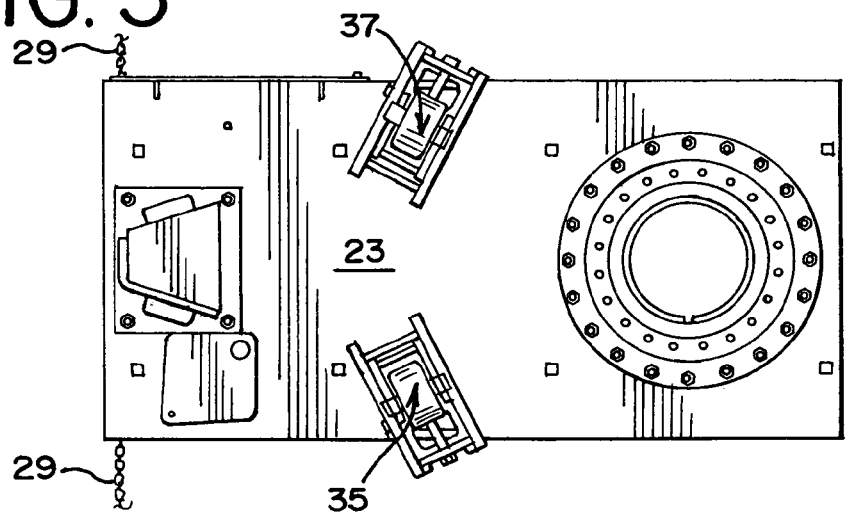
FIG. 3 is a top plan view of the base frame in the tree delimber seen in FIGS. 1 and 2, showing the roller support system of the present invention.
Figure 4:
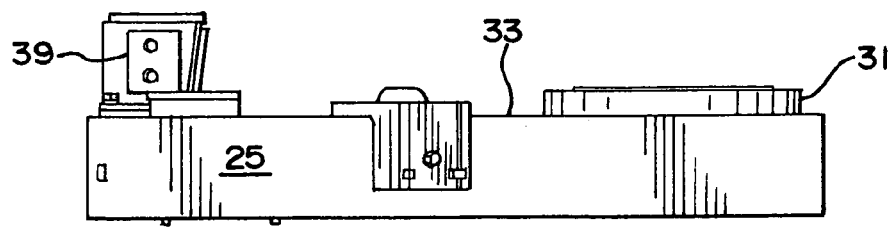
FIG. 4 is a side elevational view of the base frame seen in FIG. 3.

Referring now also to FIGS. 3-5, the base frame 12 comprises a rectangular box structure 21 fabricated of steel plate by conventional welding techniques. The box structure 21 includes a roof plate 23, side plates 25 bent downwardly therefrom and end plates 27. The box structure 21 is adapted to be mounted on a suitable transport device (not shown) for moving the delimber 10 from location to location. In the latter regard, anchor chains 29 are provided for use during transport.

As seen in FIG. 5, an annular bearing ring 31 is fastened to the upper surface 33 of the roof plate 23 adjacent one end of the box structure 21. The yoke assembly 14 is rotatably mounted on the box structure 21 in the bearing ring 31. Also mounted on the box structure 21, and protruding out of the roof plate 23 and respective side plates 25, are identical but oppositely oriented roller support units 35 and 37. The units 35 and 37 are components of the roller support system 38 embodying features of the invention.

The roller support system 38 supports the yoke assembly 14 as it rotates about its mounting on the bearing ring 31. On the opposite (rear) end of the base frame 12 from the bearing ring 31 is a stop unit 39 for limiting rotation of the yoke assembly 14 about the axis of the bearing ring 31.

As seen in FIGS. 1, 2 and 7, the yoke assembly 14 comprises a box-like frame 41 fabricated in a conventional manner of steel plate. The frame 41 is surmounted by upright pillars 43 on opposite sides. On top of each pillar 43 is a bearing block 45. These bearing 45 blocks pivotedly support the cutter head assembly 18.

Forming the bottom of the frame 41, and extending out from under it in a direction transverse to the box and pillars 45, is a floor plate 47. As best seen in FIG. 7, the bottom surface 49 of this plate 47 has an annular bearing 51 on one end of the plate and a pair of arcuate bearing tracks 53 and 55 opposite it. The bearing 51 is designed to seat in and rotate on the bearing ring 31 which is part of the base frame 12. At the same time, the bearing tracks 53 and 55 are designed to ride on corresponding roller units 35 and 37, which are identical to each other and form part of the roller support system 38.

As seen in FIGS. 5 and 6, each roller unit 35 and 37 includes a roller housing 61 welded into the box structure 21. A wedge box 63 is slideable in the roller housing 61. A draw bolt 65 is journalled in a vertical end wall 66 of the roller housing 61 and extends through a vertical end wall 67 of the wedge box 63. A hexagonal nut 69 is installed on the end of the draw bolt 65. The nut 69 is seated in a hexagonal cut out formed in a nut retainer 73 welded to the vertical end wall 67 of the wedge box 63.

Each roller unit 35 and 37 also includes a roller shaft 75 seated in vertical slots 77 milled into opposite sides of the roller housing 61. The shaft 75 has a flat 79 milled in its side on each end of the shaft, and those flats 79 rest on an inclined top surface 81 of a corresponding side wall in the sliding wedge box 63. Vertically downward movement of the roller 83 is limited by engagement of these shaft flats 79 with the inclined surfaces 81 of the wedge box 63. Vertically upward travel of the roller 83 is limited by contact with the bottom surface of the corresponding track 53, 55.

With the yoke assembly 14 mounted for rotation on the rotational bearing 31, which is rigidly mounted in a horizontal plane, the rollers 83 will normally be positioned approximately ¼" below the bottom surface of the bearing tracks 53, 55. Each draw bolt 65 is then turned clockwise to thread the nut 69 further onto the bolt and cause the wedge box 63 to slide away from the centerline of the yoke assembly 14. As the wedge box 63 slides, the roller shaft 75 rides up the inclined top surface 81 of the corresponding walls in the wedge box 63, causing the roller 83 to rise to the point of contacting and supporting the bottom surface of the corresponding bearing track 53, 55. Once properly positioned, the nut 69 (which is self-locking) maintains proper adjustment and prevents any further movement of the wedge box 63.

Any wear in the rollers 83 or bottom surface of the tracks 53, 55 can be compensated for by turning the draw bolts 65, as required, to maintain contact. Each draw bolt 65 is readily accessible to the apparatus operator from the side of the apparatus.

The new roller adjustment design allows a mechanic to quickly adjust the support roller(s) 83 with a single wrench while standing next to the trailer on which the delimber 10 is normally mounted. This eliminates the necessity of accessing the under-side of the delimber base assembly, which is often blocked by debris. The contact area between each roller 83 and the corresponding track surface (53, 55) is within a direct line of sight from the adjustment area, eliminating the need for trial and error adjustments.

The new design also ensures uniform contact between the rollers 83 and the bottom of the yoke assembly 14 without any additional attention required on the part of the operator or mechanic. This produces uniform loading which results in even wear of the components and a vast increase in life of the roller, bushings, and mating bearing surfaces.

A significant reduction in the time required to properly adjust the roller(s) is also realized due to the elimination of jam nuts and a reduction in the number of adjustments bolts from two to one per roller. Also, in a typical application the need to clear debris to access the bottom of the delimber base is eliminated.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

The invention claimed is:

1. A tree delimber, comprising:
   a) a base frame, said base frame including a horizontal roof plate;
   b) a cutter head assembly;
   c) a yoke assembly including a floor plate mounted on said horizontal roof plate for rotation about a vertical axis, said yoke assembly supporting said cutter assembly for pivotal movement about a horizontal axis; and
   d) a roller system disposed between said horizontal roof plate and said floor plate and supporting said yoke assembly;
   e) said roller system including a roller unit on said base frame;
   f) said roller unit including a support roller journalled in a roller housing on a horizontal axle shaft and extending upwardly from said horizontal roof plate;
   g) an adjustment member in said roller housing and engaging said axle shaft;
   h) said adjustment member being movable horizontally in said roller housing and, as it moves, being effective to raise and lower said lower vertically relative to said horizontal roof plate so as to properly engage said floor plate;

i) said moveable adjustment member including a wedge shaped element having an inclined support surface;
j) said wedge shaped element supporting said inclined surface on said axle shaft and being moveable horizontally in said roller housing to raise or lower said axle shaft;
k) a horizontally oriented draw bolt in said roller housing and protruding outwardly from one side of said base frame;
l) said draw bolt having a threaded section which is threadably connected to said wedge shaped element.

2. The tree delimber of claim 1 wherein:
a) said roller system includes a pair of said roller units which are substantially identical to each other;
b) said roller units being arranged in opposite sides of said base frame from said vertical axis.

3. The tree delimber of claim 1 wherein:
a) said axle shaft has a longitudinally extending flat surface on one side of said shaft;
b) said inclined surface of said wedge member engaging said flat surface to support said axle shaft.

4. A tree delimber, comprising:
a) a base frame;
b) a support frame for a cutter head assembly;
c) said support frame being mounted on said base frame for rotation relative to said base frame about a vertical axis, said base frame including horizontally spaced sides opposite each other from said vertical axis;
d) said base frame having a roller support system including a roller unit mounted on said base frame adjacent each of said opposite sides, each of said roller units including a roller housing mounted in said base frame and a roller in said housing, rotatable about a horizontal axis and adapted to engage said support frame;
e) each of said roller housings containing a roller support member movable horizontally in the housing and effective, when moved horizontally, to raise or lower the corresponding roller vertically as it moves; and
f) a threaded shaft extending horizontally out of each of said housings and accessible from the respective side of said base frame so as to facilitate rotation of said threaded shaft and move said roller support member horizontally.

5. The tree delimber of claim 4 wherein:
a) said roller support member comprises a wedge member movable horizontally in each of said housings;
b) horizontal movement of said wedge member by said threaded shaft being effective to vertically raise or lower the corresponding roller.

6. The tree delimber of claim 5 wherein:
a) each of said rollers is mounted for rotation on an axle shaft;
b) said axle shaft for each roller being supported by an inclined surface on a corresponding wedge member.

7. A tree delimber, comprising:
a) a base frame;
b) a support frame for a cutter head assembly;
c) said support frame being mounted on said base frame for rotation relative to said base frame about a vertical axis, said base frame including horizontally spaced sides opposite each other from said vertical axis;
d) said base frame having a roller support system including a roller unit mounted on said base frame adjacent each of said opposite sides, each of said roller units including a roller housing mounted in said base frame and a roller in said housing, rotatable about a horizontal axis and adapted to engage said support frame;
e) each of said roller housings containing a roller support member movable horizontally in the housing and effective, when moved horizontally, to raise or lower the corresponding roller vertically as it moves; and
f) an adjustment member extending horizontally out of each of said housings and accessible from the respective side of said base frame so as to permit each of said members to be manually adjusted from respective sides of said base frame;
g) said adjustment members being manually adjustable by being moved horizontally relative to respective housings.

8. The tree delimber of claim 7 further characterized in that;
a) said adjustment members are manually adjustable by being rotated generally about a horizontal axis while corresponding rollers are raised or lowered.

* * * * *